Jan. 8, 1963 W. L. MILLER 3,071,812
ROTARY MOLDING MACHINE
Filed Aug. 17, 1959 13 Sheets-Sheet 1

INVENTOR.
William L. Miller,
BY
Cromwell, Greist & Warden
attys.

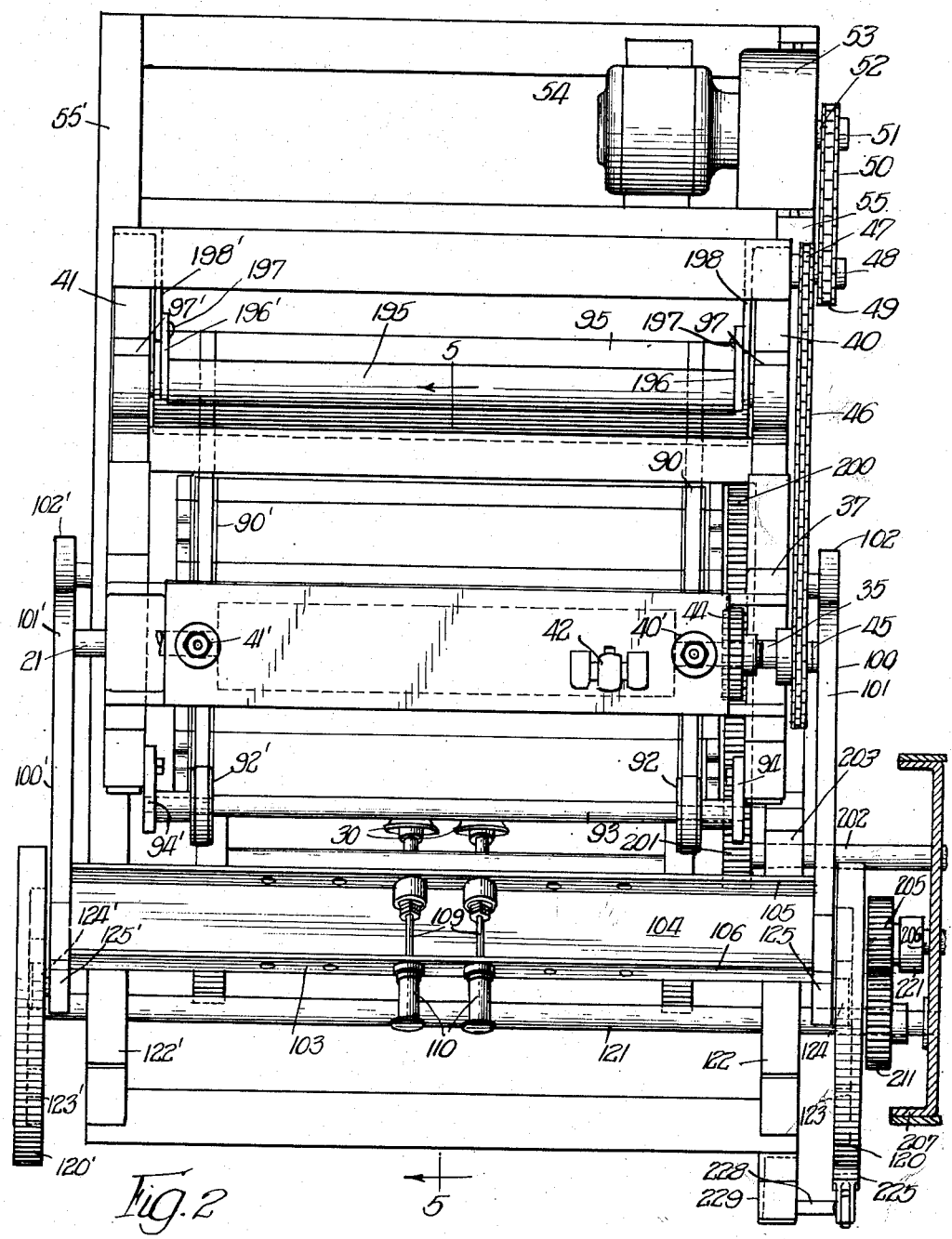

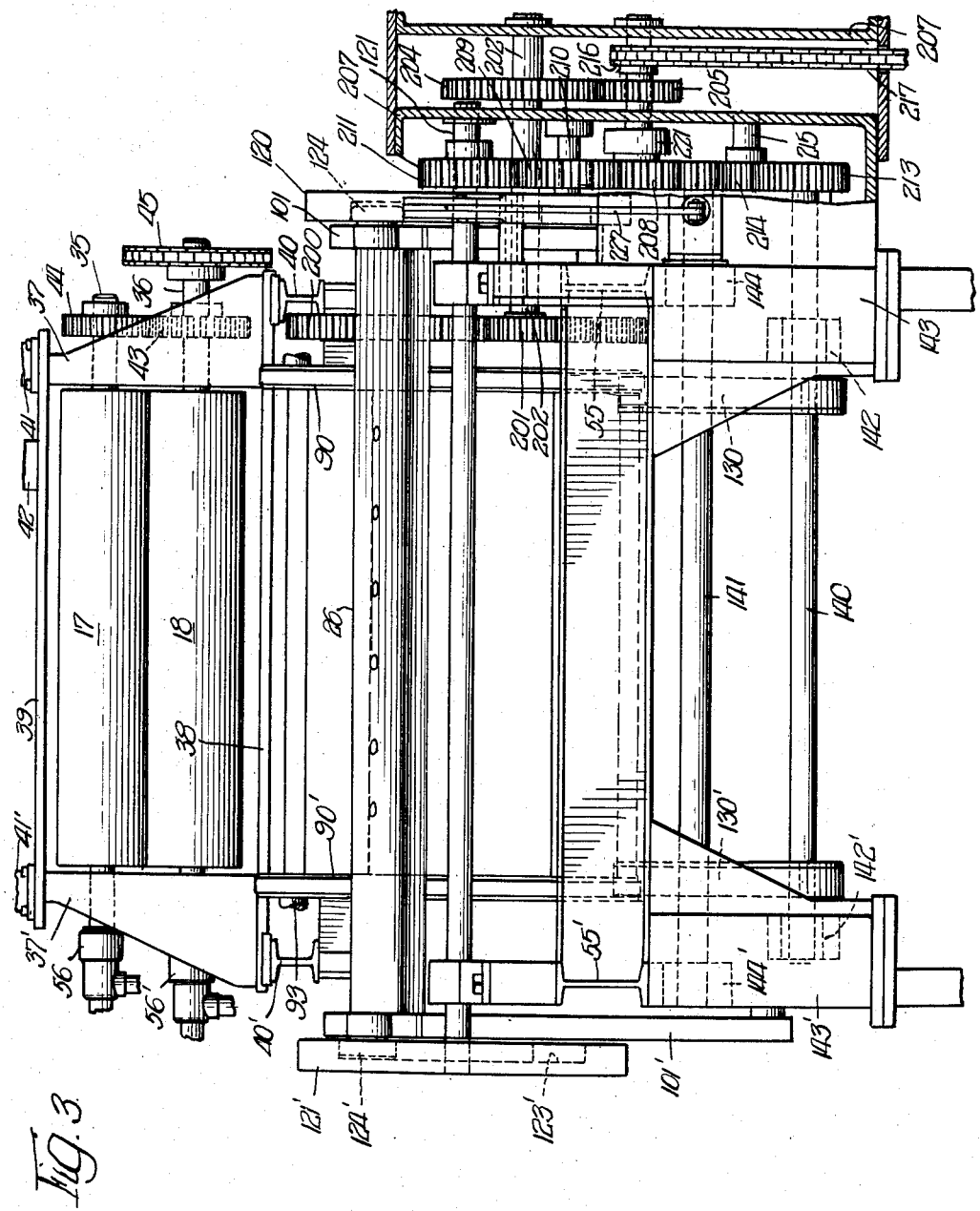

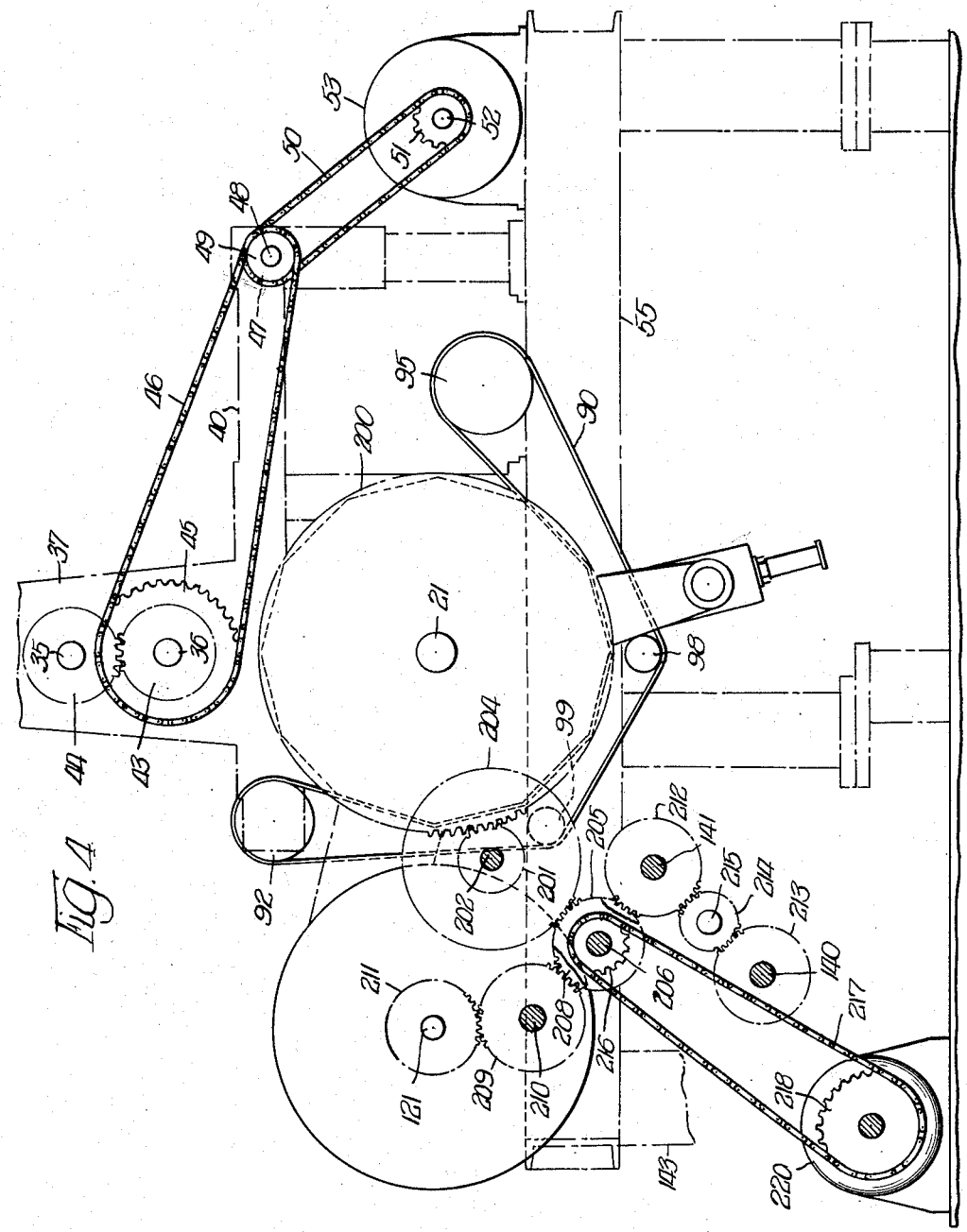

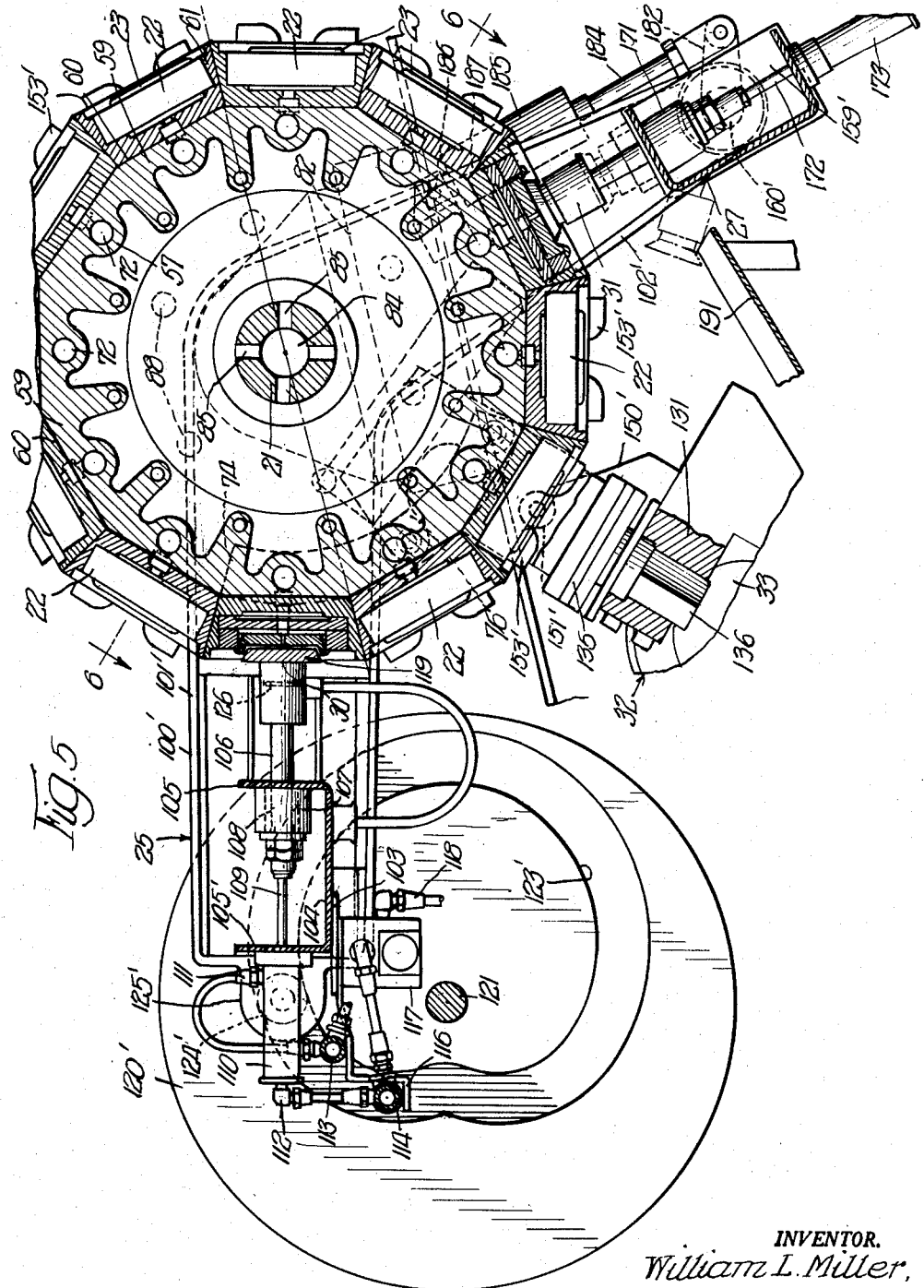

Jan. 8, 1963  W. L. MILLER  3,071,812
ROTARY MOLDING MACHINE
Filed Aug. 17, 1959  13 Sheets-Sheet 6
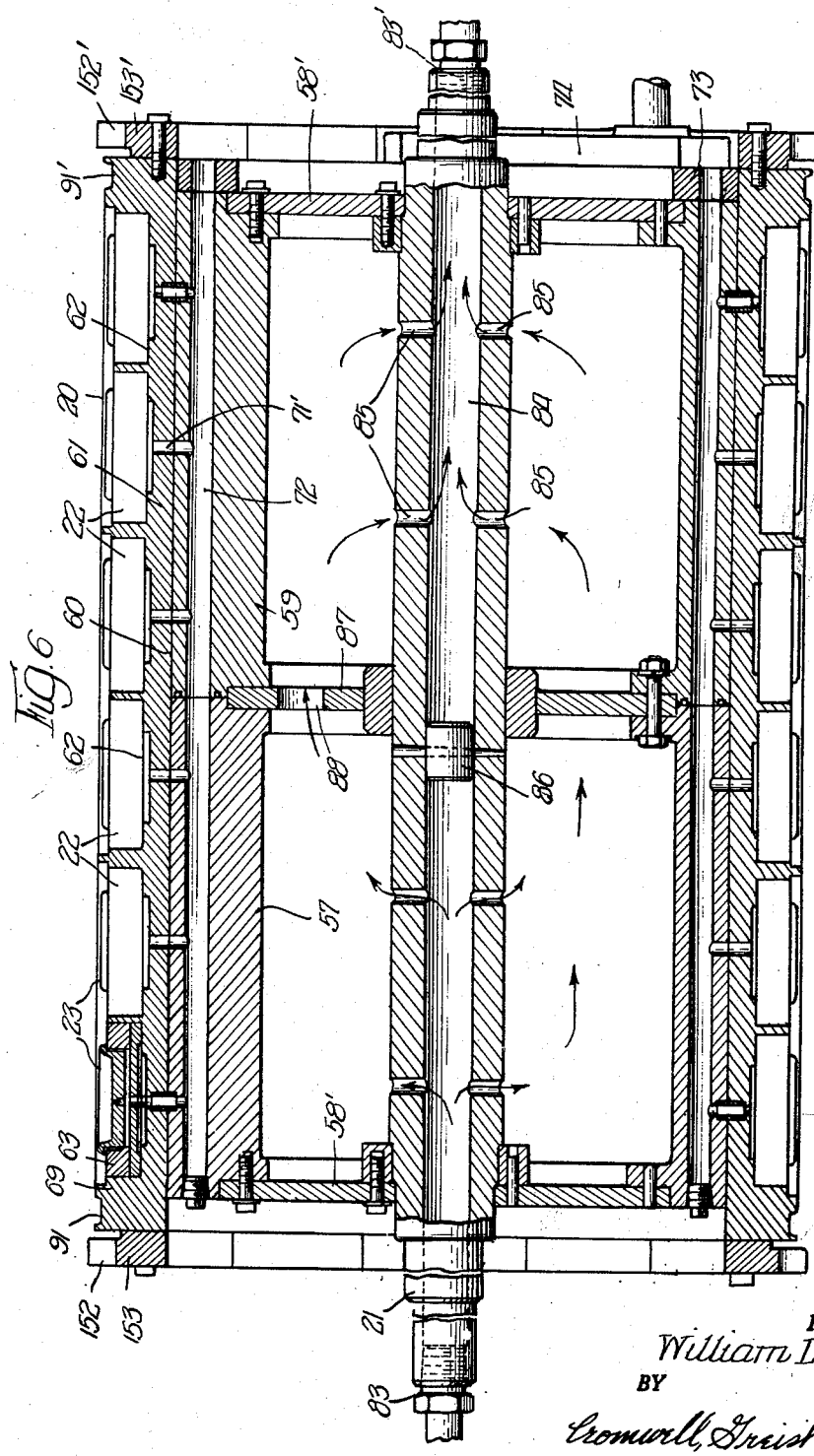
INVENTOR.
William L. Miller,
BY
Cromwell, Greist & Warden

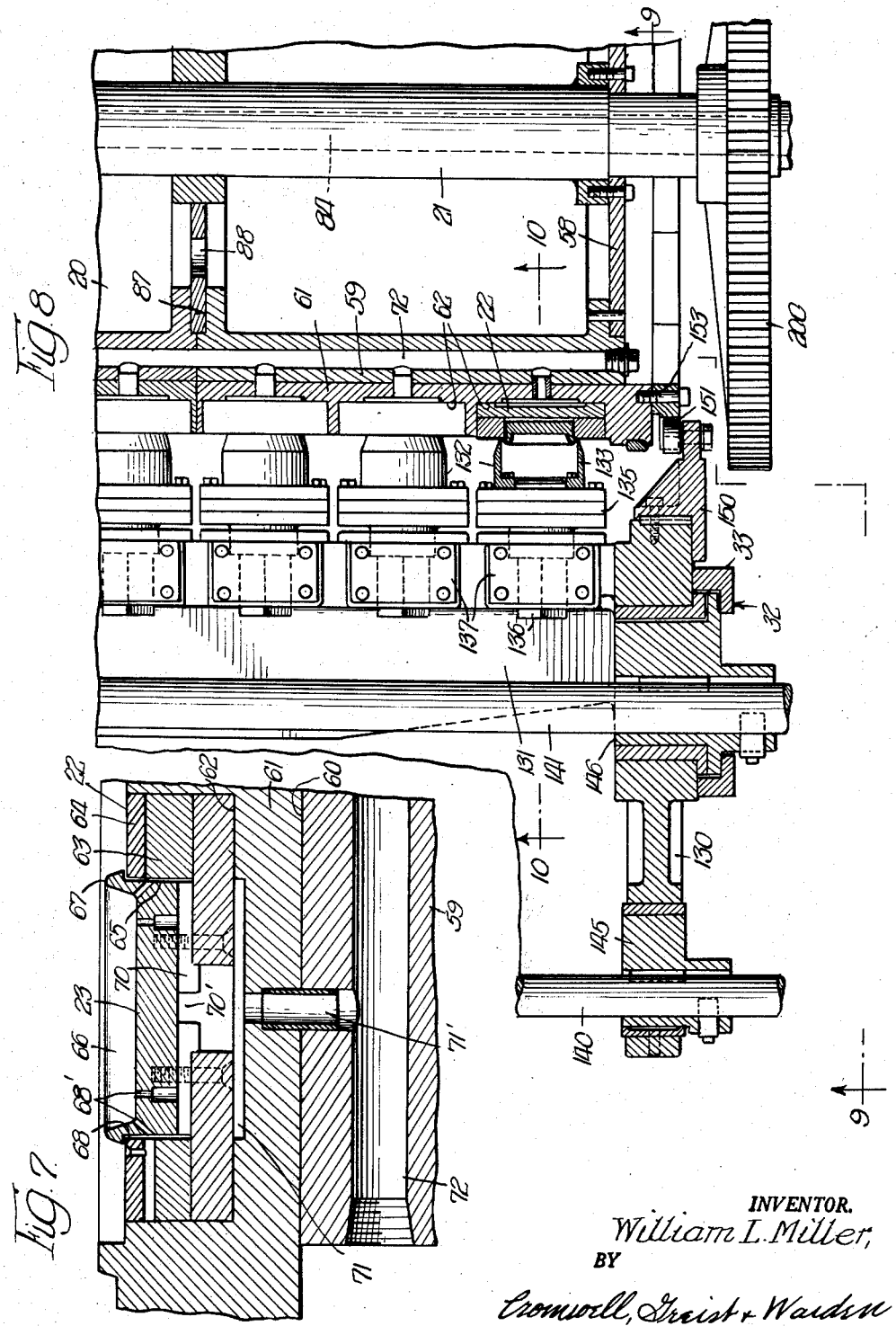

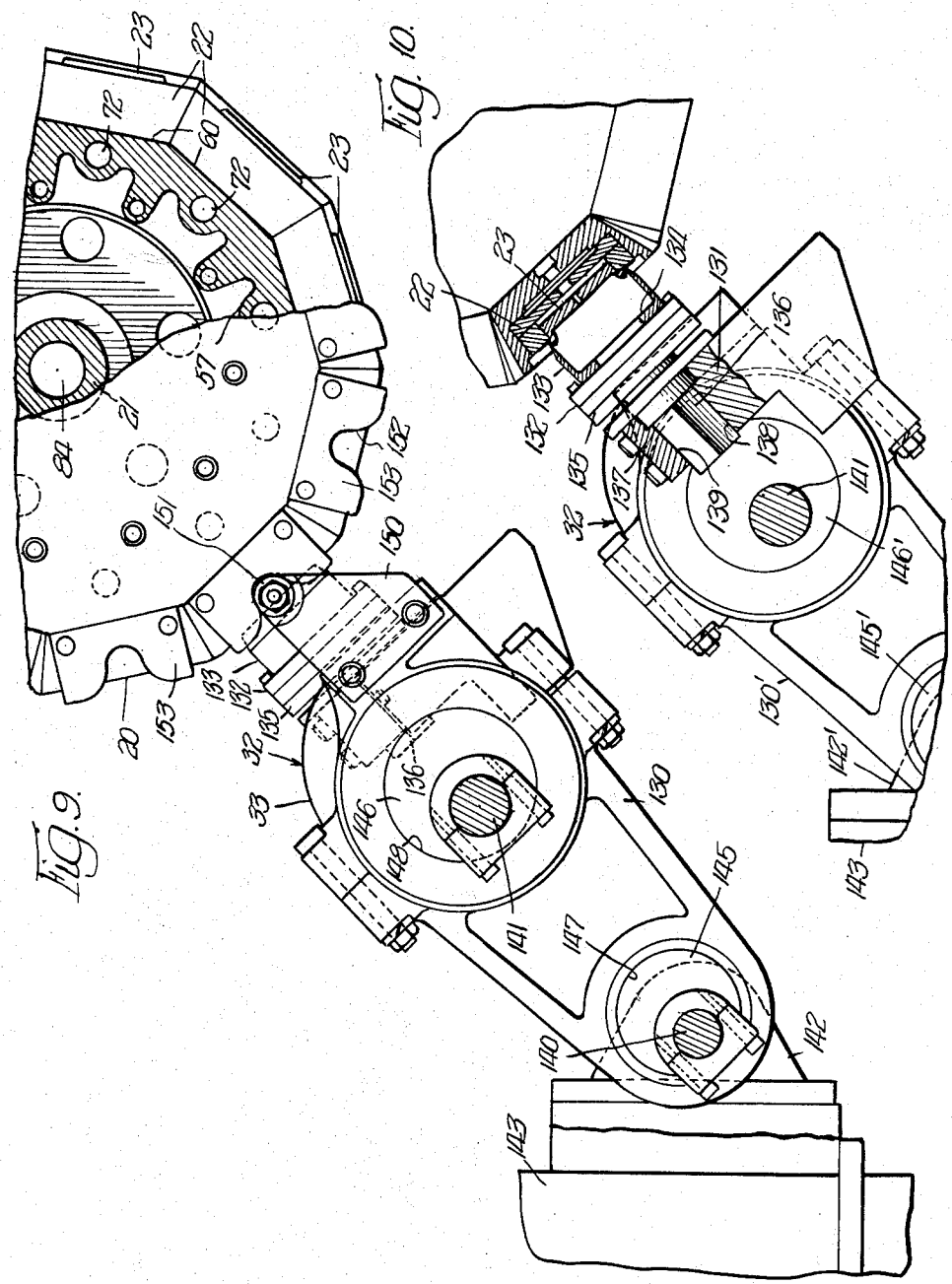

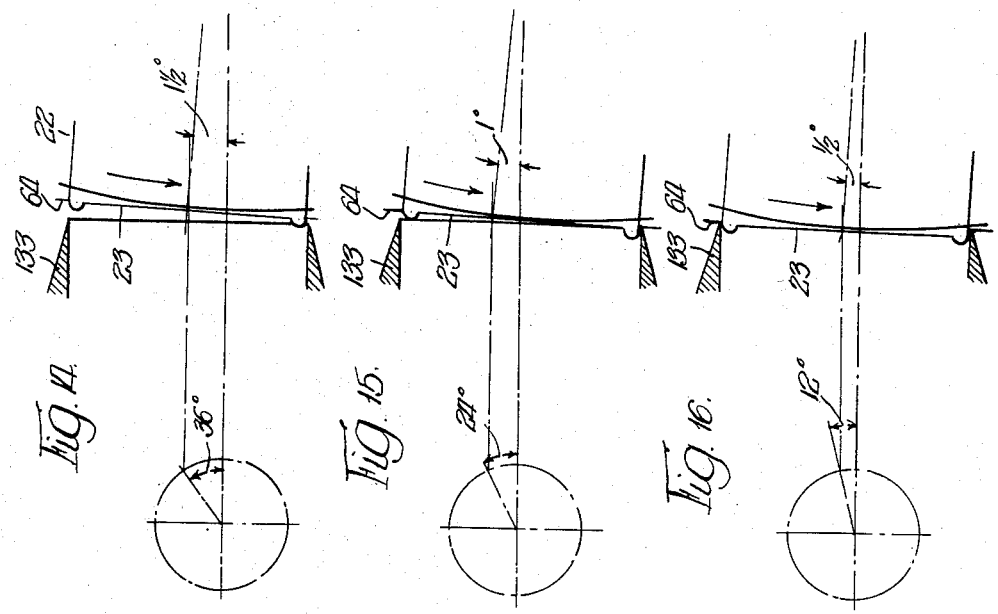
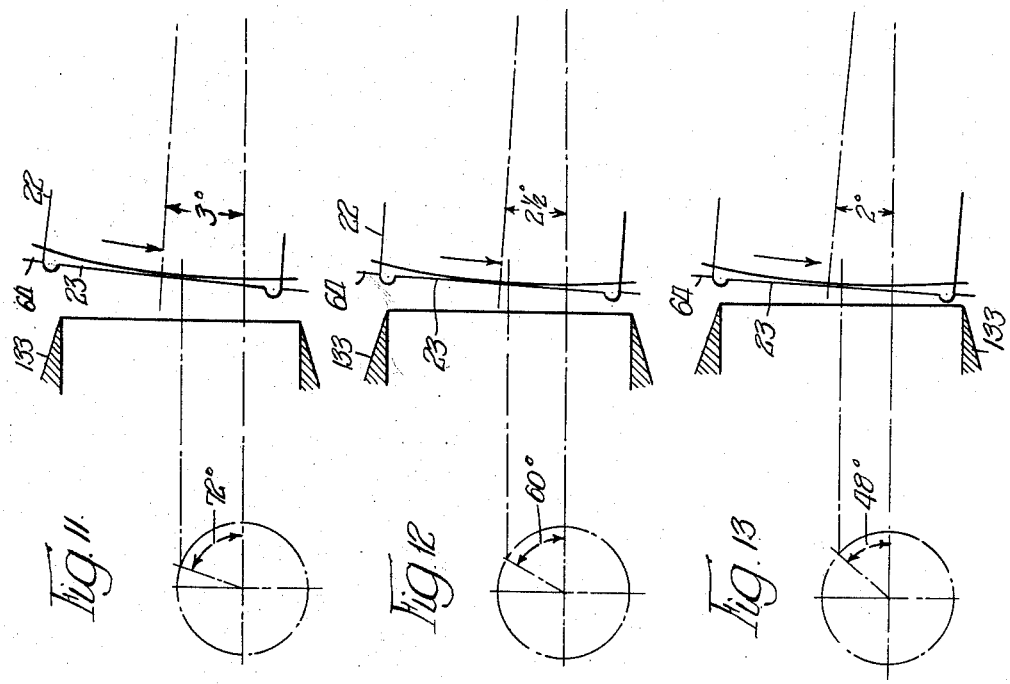

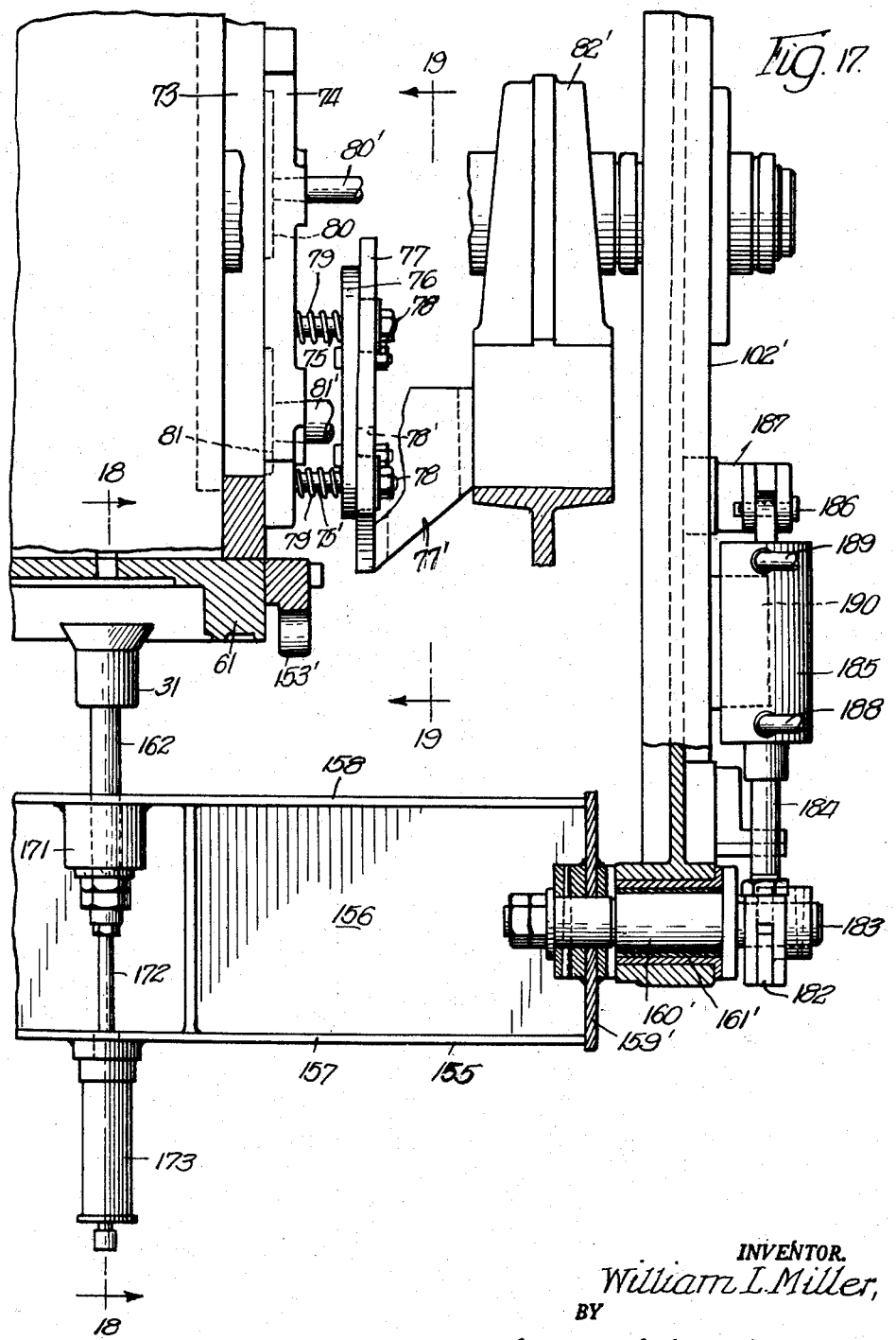

Jan. 8, 1963 W. L. MILLER 3,071,812
ROTARY MOLDING MACHINE
Filed Aug. 17, 1959 13 Sheets-Sheet 11
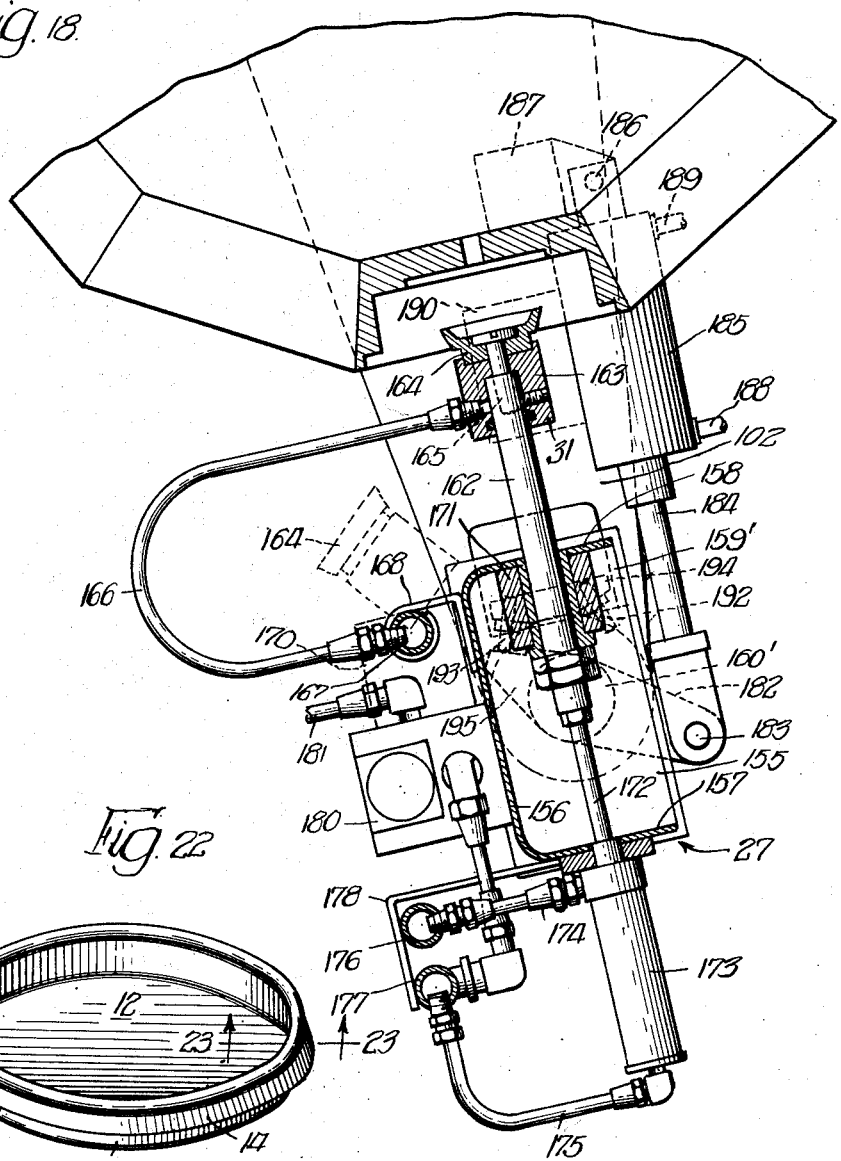
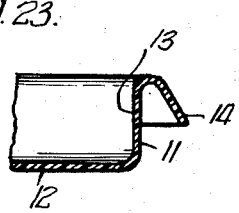
INVENTOR.
William L. Miller,
BY
Cromwell, Greist & Warden Jan. 8, 1963     W. L. MILLER     3,071,812
ROTARY MOLDING MACHINE
Filed Aug. 17, 1959     13 Sheets-Sheet 12
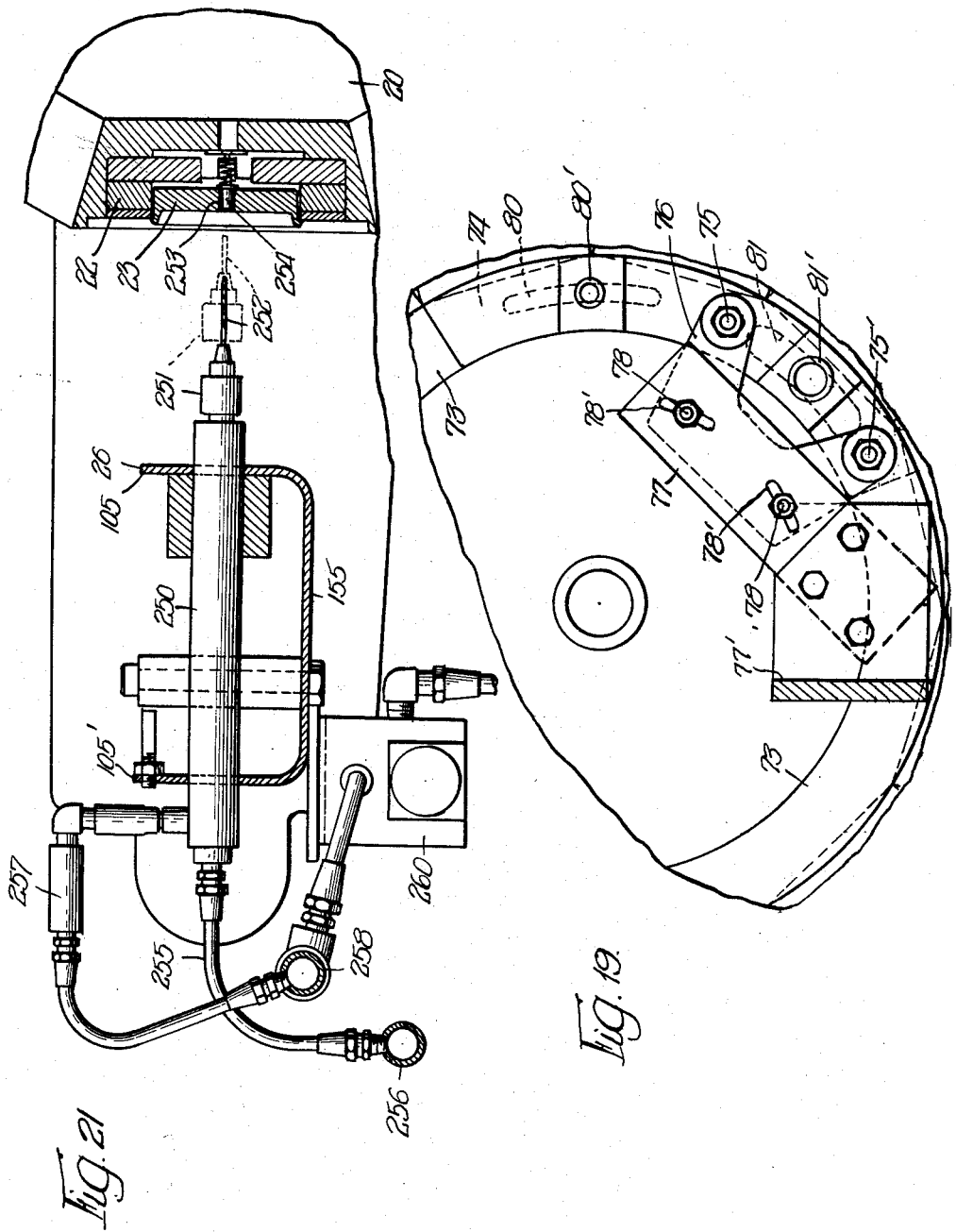
INVENTOR.
William L. Miller,
BY
Cromwell Greist & Warden

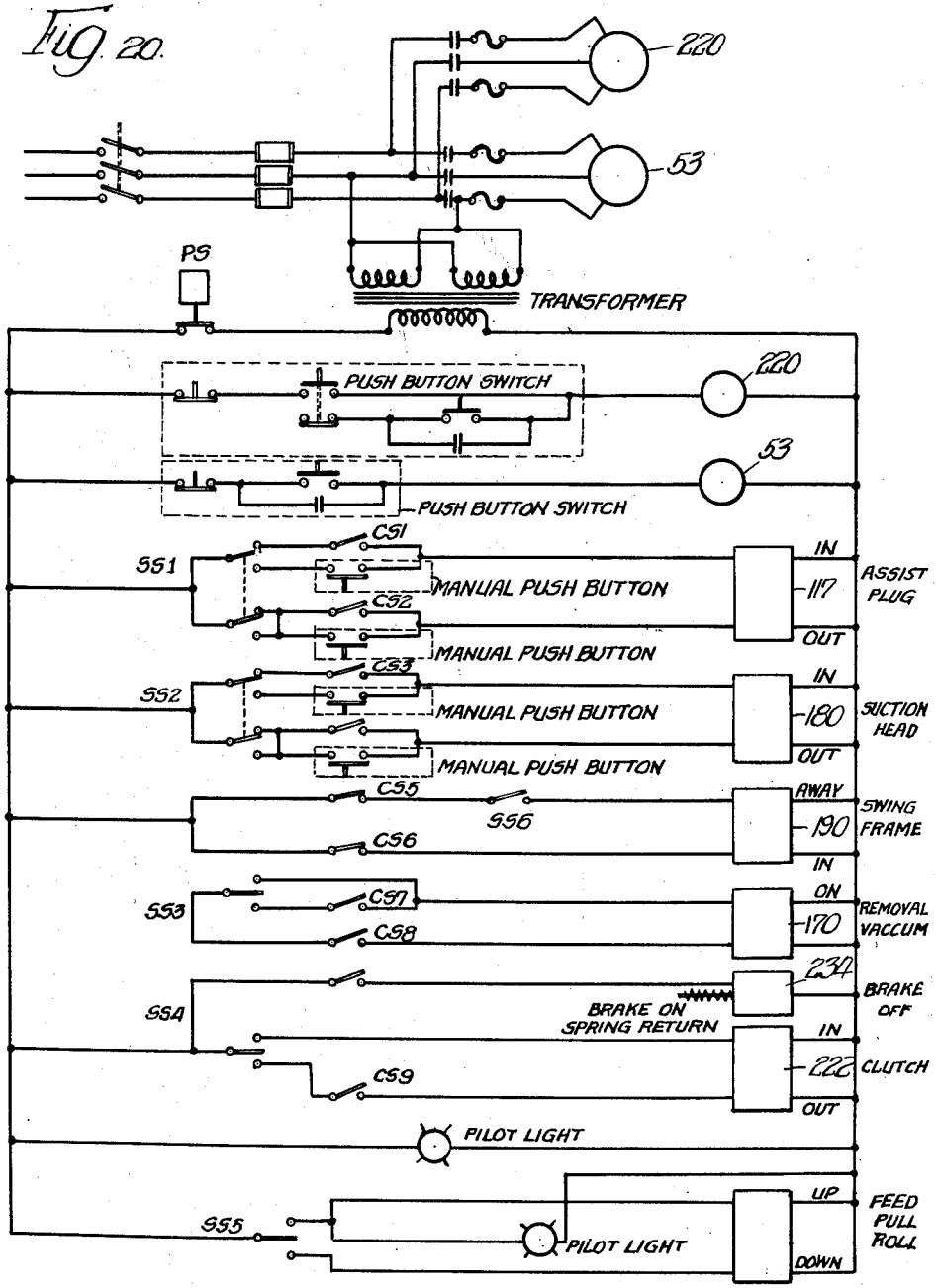

# United States Patent Office

3,071,812
Patented Jan. 8, 1963

3,071,812
ROTARY MOLDING MACHINE
William L. Miller, Skokie, Ill., assignor to Continental Can Company, Inc., New York, N.Y., a corporation of New York
Filed Aug. 17, 1959, Ser. No. 834,200
14 Claims. (Cl. 18—21)

This invention relates to the fabrication of plastic products and is more particularly concerned with improvements in an apparatus for forming or shaping thermoplastic sheet material so as to produce a plurality of shaped articles which are then cut from the sheet.

It is a general object of the invention to provide an improved apparatus for advancing a web of thermoplastic sheet material around a portion of the periphery of a continuously traveling drum, for rapidly forming on peripherally spaced forming dies carried thereon shaped articles and for cutting the shaped articles from the web and removing the same from the dies.

It is a more specific object of the invention to provide an apparatus for rapidly forming a plurality of shaped articles from an endless web of thermoplastic material wherein the web is advanced from an extruder around a portion of the periphery of a forming drum on which a series of forming die members are mounted with associated mechanisms for forming sections of the web on the dies, cutting around the articles thus formed and removing the articles from the dies without interrupting the continuous travel of the web.

It is another object of the invention to provide an apparatus for molding successive articles from a traveling web of thermoplastic sheet material wherein the web is advanced around a portion of the periphery of a die carrying drum which is mounted for continuous rotation on a transverse axis and wherein a frame structure is provided which comprises end support frames having angularly related arms which extend in a direction radially of the drum and which carry on peripherally spaced cross frames means for cooperating with the dies on the drum in forming the articles and means for removing the articles from the dies after they are cut from the web.

It is still another object of the invention to provide a machine for molding articles from a continuously traveling web of plastic material which machine comprises a molding or forming die carrying drum mounted on a transverse shaft and supporting frames for a series of web engaging devices which cooperate with the dies on the drum to form in the web a plurality of shaped articles, the supporting frames comprising end frame members mounted for reciprocable swinging movement on an axis coinciding with the axis of the drum so as to be movable with the drum for a predetermined portion of its travel and radially extending arm members which are connected at their ends by cross frames on which the web engaging members are mounted for reciprocation toward and from the peripheral surface of the drum simultaneously with the swinging movement of the frame.

It is a further object of the invention to provide a rotary molding machine for fabricating articles from a heated moldable plastic web which comprises a rotatably mounted cylindrical molding frame having a series of molding dies mounted on the periphery thereof and associated mechanism spaced around the periphery of the molding frame for shaping and cutting the articles and for removing the articles from the machine, which mechanism includes a cutting die carrying frame mounted at opposite ends on pairs of eccentrics which are rotated in synchronized relation about axes which are parallel with the axis of rotation of the die carrying cylinder to move the cutting die frame in a circular path so as to bring the cutting dies carried thereon into and out of cutting engagement with the molding dies for cutting successive rows of formed articles from the web.

It is a still further object of the invention to provide a rotary molding machine for shaping a plurality of articles in a traveling web of plastic material wherein a series of transversely and peripherally spaced molding dies are carried on a cylindrical frame which is mounted for rotation on its major axis and which has associated mechanism for guiding a plastic web around a portion of its periphery so as to bring sections of the web over the respective dies, mechanism for forming the web sections on the dies, mechanism for cutting the formed sections from the web by a shearing operation and mechanism for removing the cut sections from the machine, with portions of the forming mechanism and the removing mechanism carried on a pivoted frame which is mounted for reciprocal swinging movement about the axis of rotation of the cylindrical die carrying frame.

It is another object of the invention to provide a rotary molding machine having a series of article forming dies mounted on the periphery of a cylindrical molding frame, mechanism for feeding a plastic web to the molding frame so that portions of the web are draped over the exposed faces of the forming dies, suction means associated with the molding frame for drawing portions of the web against the faces of the dies and a mechanism for cutting the formed articles from the web which comprises a series of cutting blades, a supporting frame adapted to carry the cutting blades, and a mounting for the supporting frame which includes double eccentrics on a pair of shafts having their axes lying in a radial plane extending through the axis of the molding frame.

A further object of the invention is to provide a rotary molding machine which is characterized by a series of forming dies spaced around the periphery of a rotatably mounted, continuously traveling, molding drum or wheel and associated mechanism for guiding a web of plastic material in a path around the periphery of the wheel so as to bring the web over successive dies, mechanism for forming articles successively in the web by shaping portions thereof on the dies, mechanism for cutting the shaped articles free of the web and mechanism for removing the shaped and cut articles from the machine by withdrawing them from the traveling dies, first in a radial direction and then in an arcuate path.

A still further object of the invention is to provide in a rotary molding machine of the type described, apparatus for removing the cut and shaped articles from the forming drum which comprises a series of suction cups reciprocably mounted on a cross frame which is supported for swinging movement adjacent the periphery of the forming drum on an axis which is parallel with the axis of the drum and which is spaced outwardly of the molding dies, with the frame being also reciprocable in a circular path having its axis coinciding with the axis of rotation of the drum.

These and other objects and advantages of the invention will be apparent from the a consideration of the molding machine which is shown by way of illustration in the accompanying drawings, wherein:

FIGURE 2 is a plan view of the machine with portions thereof omitted or broken away;

FIGURE 3 is an elevation at the discharge end of the machine with portions broken away;

FIGURE 4 is a partially schematic side elevation, illustrating the power drives for operating the various mechanisms;

FIGURE 5 is a longitudinal section taken on the line

Figure 1:
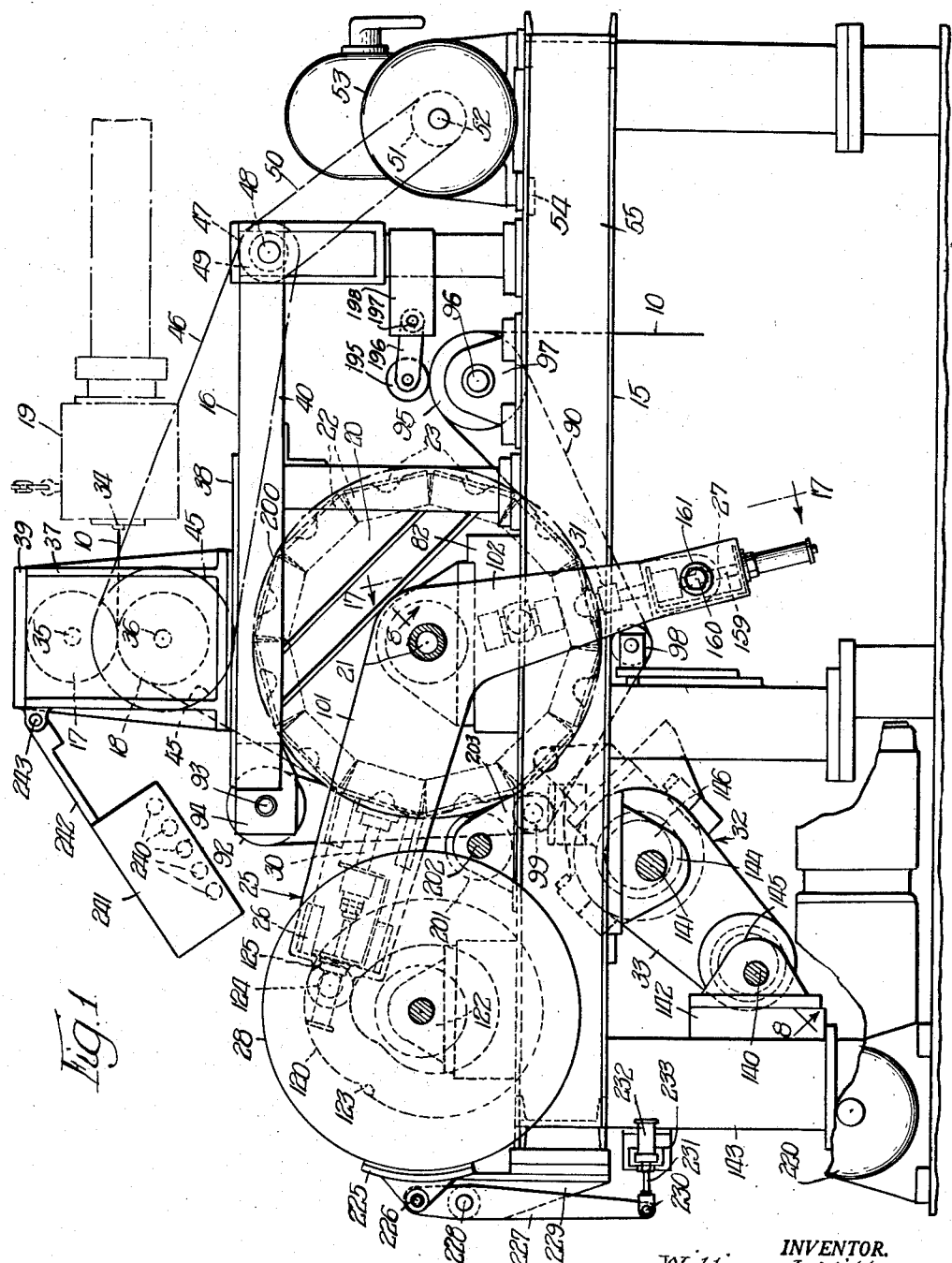
FIGURE 1 is a side elevation, with portions broken away or omitted, of a molding machine having incorporated therein the principal features of the invention.

5—5 of FIGURE 2, to an enlarged scale and with portions broken away;

FIGURE 6 is a cross section through the molding drum which is taken generally on the line 6—6 of FIGURE 5;

FIGURE 7 is a fragmentary sectional view to an enlarged scale showing a portion of the die assembly, the die holder and the molding drum;

FIGURE 8 is a partial section taken on the line 8—8 of FIGURE 1, showing the cutting mechanism and a portion of the molding drum;

FIGURE 9 is a section taken generally on the line 9—9 of FIGURE 8;

FIGURE 10 is a fragmentary section, the view being taken generally on the line 10—10 of FIGURE 8;

FIGURES 11 to 16 inclusive show diagrammatically the relative movement of the cutting die head and the molding die assembly as the cutting operation is performed;

FIGURE 17 is a sectional view taken on line 17—17 of FIGURE 1, to an enlarged scale, showing the article pick-off mechanism and a portion of the molding drum;

FIGURE 18 is a longitudinal section taken on the line 18—18 of FIGURE 17;

FIGURE 19 is a fragmentary section taken on the line 19—19 of FIGURE 17;

FIGURE 20 is a wiring diagram showing the electrical controls for the machine;

FIGURE 21 is a fragmentary longitudinal vertical section showing a modification;

FIGURE 22 is a perspective view of an article which is adapted to be formed on the machine; and FIGURE 23 is a fragmentary section taken on the line 23—23 of FIGURE 22, to an enlarged scale.

The machine which is illustrated in the drawings is adapted to form or mold from a continuously traveling web 10 (FIGURES 1, 22 and 23) of a suitable thermoplastic sheet forming material, a plurality of relatively thin walled articles 11 which are particularly adapted for use as lids or covers on drinking cups of paper or other materials. The lids 11 each comprise (FIGURES 22 and 23) a top wall forming disc 12, a relatively narrow flange-like tubular wall section 13 with its upper edge reversely bent to provide a downwardly and outwardly extending lip 14, which remains with the lid when the latter is separated from the web 10. The lids 11 are formed in the traveling web 10 and are separated from the latter immediately after they are formed by die-cutting around the outside of the rim or lip 14. The machine, as illustrated in FIGURES 1 and 2, is designed to form the lids in successive rows of six extending across the width of the web with the lids in each row being shaped simultaneously in the machine.

The molding machine and its operation will be best understood by reference first to the main components of the machine and the manner in which they cooperate to form the lids 11, with the separate elements being hereinafter described in detail. Briefly, the operative elements of the machine are mounted on an upright frame structure 15 (FIGURE 1) which has a superstructure 16 on which a pair of web sizing rolls 17 and 18 are supported and between which the web 10 is fed from an extruder head 19, the latter being supported on an independent frame structure (not shown). The web may be supplied from roll stock if desired. The web 10 is advanced by the combination sizing and feeding rollers 17 and 18 to a molding drum or cylinder 20 which is rotatably mounted on a transverse shaft 21 and which carries on its periphery a series of article forming or molding die assemblies 22 which are arranged in peripheral and axial alignment on the drum and each of which is adapted to include a forming or molding die 23. The web 10 is carried around a portion of the periphery of the molding drum 20 so that sections of the web of sufficient size to form a lid are laid over the outwardly facing surfaces of the molding dies 23. The molding drum 20 is rotated continuously about the axis 21 so as to advance each transverse row of dies 23 into engagement with the lower surface of the web 10 and to carry the same around the drum while the web is draped thereover for a portion of the circular path of each of the dies. A supporting frame 25 is mounted for reciprocating swinging motion about the axis of the cross shaft 21 which frame 25 carries cross frames 26 and 27, the latter being arranged in spaced relation relative to the periphery of the molding drum 20. The support frame 25 is given a reciprocating swinging motion in a path of relatively small extent by an operating cam mechanism 28. The cross frame 26 is adapted to support a series of assist plugs 30 which are adapted to cooperate with the dies 23 in forming the lids 11 on the latter. The cross frame 27, which is spaced a substantial distance from the cross frame 26 on the support frame 25, is adapted to support a series of article pick-off members 31 which are operative to remove the lids 11 from the dies 23 after the formed lids 11 have been cut free of the web 10. A die cutting mechanism 32 is carried on a movably mounted support frame 33 which is located between the cross frames 26 and 27 and which is mounted for travel in a circular path. The die cutting mechanism 32 is operative to cut around the lid forming portions of the dies 23 so as to free the lids 11 from the web 10 leaving the completely formed lids 11 on the dies 23 from which they are removed by the pick-off mechanism 31, while the waste portion of the web 10 is advanced to a point where it leaves the drum 20 and is discharged from the machine.

The extruding head 19 (FIGURE 1) which is employed is of conventional construction and will not be described in detail since it forms no part of the present invention. It is adapted to continuously extrude a web or sheet 10 of plastic film from a plastic material which provides the desired molding characteristics, which is of substantial thickness and which has the width required for the capacity at which the machine is to be operated. The preferred material is polystyrene plastic of a composition suitable for extruding in film or web form. Other plastic materials, such as, for example, polyethylene, which have similar extruding and molding characteristics may be used.

The plastic film or web 10 is delivered from the lips 34 (FIGURES 1 to 3) of the extruder head 19 to the sizing rollers 17 and 18 which advance the web to the article molding or forming drum 20. The sizing rollers 17 and 18 are mounted on cross shafts 35 and 36 which are journaled at their ends in suitable bearings mounted in upstanding side frame members 37 and 37'. The side frame members 37 and 37' are supported on a bottom cross plate 38 and are connected by a top cross brace 39. The bottom plate 38 extends between the I beams 40 and 40' which form the top side rails for the superstructure 16. The uppermost bearings in which the ends of shaft 35 are journaled are vertically movable in the frame members 37 and 37' under the control of hydraulic cylinders 41, 41' with a suitable control valve 42 for operating the cylinders so that the feed rollers may be moved apart to a non-feeding position when desired. The cross shafts 35 and 36 which carry the feed rollers 17 and 18 are extended at the one end to receive a pair of interengaging gears 43 and 44 and the lower shaft 36 is further extended to receive a sprocket 45 which is connected by the drive chain 46 with a sprocket 47 on a stub shaft 48, the latter being journaled in a suitable bearing in the subframe 16 at the end of the side rail 40. The stub shaft 48 carries a sprocket 49 which is connected by the drive chain 50 with an output sprocket 51 on the drive shaft 52 of a motor unit 53, the latter being supported on a suitable bracket 54 extending between the I beams 55 and 55' which form the top side frame members of the main support frame 15. Operation of the motor unit 53, of course, drives both of the feed rollers 17 and 18 in synchronism. The feed rollers 17 and 18 are hollow and hot water may be supplied to these rolls through suitable conduit having connections 56 and 56' at the non-driven ends of the support shafts 35 and 36.

The plastic web 10 is delivered by the sizing rollers 17 and 18 to the article forming or molding drum 20 (FIGURE 1) on the main frame 15 and advances around the front and lower portion of the periphery of the drum 20. The body of the drum 20 is in the form of a hollow cylindrical shell 57 (FIGURES 5 to 8) which may be divided into two sections for assembly and which is supported by end plates 58, 58' arranged in axially spaced relation on the hollow cross shaft 21. The shell 57 is divided on its outer periphery into twelve circumferentially and axially extending sections 59 having planar faces 60 on which die holders 61 are seated in edge-to-edge abutting relation. The die holders 61 are each divided into six outwardly opening die receiving pockets or recesses 62 which are arranged in axially extending alignment or row forming relation with each recess 62 being aligned circumferentially with the recesses in the adjoining die holders so as to provide for 12 rows of 6 each. Each of the die recesses 62 is adapted to receive a die assembly 22.

Each of the die assemblies 22 includes a forming die 23 (FIGURES 6 and 7) and a holder 63 which has an anvil forming face plate 64 surrounding the outwardly opening recess 65 in which the forming die 23 is seated. The forming die 23 has its outer face shaped to provide a shallow recess or pocket 66 and a surrounding flange 67 which corresponds to the inside face of the lid 11, the flange 67 being rounded on its outer edge for forming thereon the lip 14 of the lid 11. The die 23 (FIGURE 7) has its outer cylindrical surface spaced from the side walls which define the recess 65 a sufficient distance to provide a passageway 68 which terminates at the face of the anvil plate 65 around the periphery of the die member 23. Any desired number of passageways 68' may be provided to connect the passageway 68 with different points on the face of the die 23. The passageway 68 connects, at the base of the recess 65, with a bottom recess 70 forming a passageway which in turn connects with a center passageway 70', the latter opening into a passageway forming recess 71 in the bottom of the die receiving recess or pocket 62 in the holder 61. The recess 71 is connected by a radial passageway 71' with an axially extending bore 72 in the shell section 59 of the drum 20. Each shell section 59 is provided with a bore 72 which forms a connecting passageway between the respective die holding pockets 62 in the holder 61. Each bore or passageway 72 extends the full length of the drum 20 and is plugged at one end while at the other end each bore 72 is aligned with a hole in an apertured bearing ring 73 on the end of the drum. Connection with a vacuum line is made through a fixed shoe 74 which is supported on a non-moving portion of the machine for engaging in frictional sliding relation with the ring 73 on the end of the drum 20 and which has a suitable connection with a vacuum pump.

The vacuum shoe 74 (FIGURES 5, 17, 18 and 19) is provided with a pair of outwardly extending pins 75, 75' which are received in sliding relation in a pair of cooperating bores provided in a plate-like holder member 76. The holder member 76 is adjustably attached to a mounting bracket 77 by bolts 78 extending through elongate slots 78' in the mounting bracket. Compression springs 79, 79' are provided on the pins 75, 75' which urge the shoe 74 against the ring 73. The shoe is provided with vacuum ports 80 and 81 which have connections 80' and 81', respectively, with the vacuum line. The vacuum port 80 is arranged to connect with the bores 72 which lead to the dies 23 when the latter approach and move past the forming station while the vacuum port 81 is arranged to connect with the bores 72 which lead to the dies 23 when the latter move up to the cutting station so as to hold the web 10 and the formed lids 11 against movement away from the surface of the drum 20 and the dies 23 during the cutting operation. The mounting bracket 77 may be bolted or otherwise secured to a fixed side frame member of the machine or it may be secured, as shown in FIGURE 1, by a suitable spacing member 77', to the bearing bracket 82', one of the two bearing brackets 82 and 82' which are mounted on the side frame members 55 and 55' and form the main bearing supports for the drum shaft 21.

The hollow shaft 21 is supplied with water (heated to a desired temperature) by means of suitable connections at opposite ends thereof, as indicated at 83 and 83' for controlling the temperature of the drum. The shaft 21 has an axial bore 84 and a series of radial passageways 85 which connect with the interior of the cylinder 57 so as to permit circulation of water through the drum. The shaft 21 is provided with a plug 86 at its center and the drum 20 has a dividing center disc 87 which is provided with apertures 88 for allowing the water to come in at one end of the cylinder through the hollow shaft 21 and go out at the other end of the drum through the same shaft on the other side of the plug 86.

The machine may be operated with a supply web 10 of less width than the length or width of the drum 20 but when a full width web is fed to the drum the edges of the web may be held against the surface of the drum 20 at the ends thereof by a pair of relatively narrow web supporting endless belts 90 and 90' (FIGURES 1 to 4). The belts 90 and 90' are of identical construction and are supported in an identical manner at opposite ends of the drum 20 with one run of each of the belts being received in a guide forming peripheral groove 91 and 91' (FIGURE 6). The belts 90 and 90' are supported at one end on rollers 92 and 92' which are mounted on a cross shaft 93, the latter being supported on brackets 94 and 94' provided at the forward ends of the side frame members 40 and 40' of the superstructure or upper frame 16 so that the side margins of a full width web 10 are engaged by the one run of the belts 90 and 90' as the web 10 engages the surface of the drum 20 and the marginal portions of the web 10 are clamped against the surface of the drum 20 while the web traverses a path of approximately 180°. The endless belts 90 and 90' are supported at their other ends on a roller 95 which is carried on a cross shaft 96. The cross shaft 96 is journaled at its opposite ends in bearing blocks 97 and 97' supported on the upper edge of the side frame members 55 and 55'. Idler rollers 98 and 99 (FIGURE 1) are suitably mounted in spaced relation relative to the path of the drum 20 and at opposite ends thereof for carrying the outer or return runs of each of the belts 90 and 90'. The guide belts 90 and 90', of course, are effective only when a full width web is fed to the machine. When a narrow web is fed the guide belts 90 and 90' and their supporting rollers may be omitted.

The oscillating frame 25 (FIGURES 1 to 3, 5, 6 and 17) on which the plug assist devices 30 and the lid pick-off mechanisms 31 are supported and which is mounted for swinging movement on the axis of the molding drum 20 comprises end or side frame members 100 and 100' of identical construction. The side frame members 100 and 100' are each in the form of plates which are of angular shape providing angularly related arms 101, 102 and 101', 102', respectively, with each frame being mounted for rotative movement, at the juncture of its arms, on the cross shaft 21 as a pivot axis. The side frame arms 101 and 101' are connected in transverse alignment by a cross frame structure 103 at their free ends which is in the form of a bent plate of U-shaped cross section. The channel-like cross frame plate 103 (FIGURE 5) is connected between the two transversely spaced arm members 101 and 101' so that the web portion 104 extends in a generally radial direction relative to the axis of the supporting shaft 21. The side flange portions 105 and 105' extend upwardly in spaced relation and the inner flange 105 is constructed to support a series or row of assist plugs or forming devices 30 for cooperating with the molding dies 23 in forming the lids. Each assist plug 30 has a stem 106 which is slidably mounted in the bore 107 of a bearing block 108 secured on the outermost face of the flange 105. The outer end of the stem 106 is connected to the end of the reciprocable piston rod 109 of hydraulic cylinder 110 which is mounted on the outermost flange 105' of the cross frame channel 103. Suitable connections 111 and 112 are provided for supplying fluid to the cylinder 110 through the supply pipes 113 and 114, the latter being mounted on transversely spaced brackets 116 and having flexible hose connections at their ends to the control valve 117 which is mounted on the cross channel 103 and in turn is suitably connected by the conduit 118 into the hydraulic system. Each plug assist 30 is aligned, in the direction transversely of the machine, with a die assembly 22 on the drum 20 so that the forming face 119 of the plug assist will travel on a radial line toward and from the die assembly 22 when moved by operation of the cylinder 110 as the supporting frame 25 is swung into predetermined position.

The oscillating frame 25 is given a reciprocating swinging movement, about the shaft 21 as an axis, by operation of a pair of plate cams 120 and 120' which are mounted at opposite ends of a cross shaft 121. The shaft 121 is journaled in bearing blocks 122 and 122', with the latter being supported on the side frame members 55 and 55' of the main frame 15 near the forward end of the machine. The plate cams 120 and 120' are provided with cam tracks 123 and 123' which receive cam rollers 124 and 124' mounted on bracket ears 125 and 125' provided on the outermost ends of the side frame arm members 101 and 101'. The cross shaft 121 is rotated in timed relation to the rotation of the molding drum 20 so as to move the frame 25 in a predetermined path with a portion of the path coinciding with the advancing movement of the drum 20 so that the assist plugs 30 may be moved toward and from the die assemblies 22 on the drum 20 while they are in aligned relation and traveling in the direction of the advance of the web 10. Each assist plug 30 may be heated by a suitable heating element, indicated at 126, and may be provided with a thermocouple heat control device (not shown).

The arm members 102 and 102' of the side frames 100 and 100' of the oscillating support frame 25 are connected at their outer ends by a cross frame structure 27 which supports the pick-off devices 31. The cross frame 27 is peripherally spaced from the cross frame 26 by a distance which corresponds to an angle of 120°. A cutting die mechanism 32 is mounted for operation between the assist plugs 30 and the pick-off devices 31 on a movable supporting frame 33.

The supporting frame 33 (FIGURES 1, 8, 9 and 10) for the die cutting mechanism 32 comprises side or end frame members 130 and 130' which are connected by a cross frame bar 131 on which a series of cutting die assemblies 132 are mounted in spaced relation across the bar corresponding to the spacing of the forming die assemblies 22 on the drum 20. Each of the cutting die assemblies 132 comprises a cylindrical blade 133 (FIGURES 9 and 10) extending from a base 134, the latter being secured on the end of a holder 135 which has a stem member 136 of square cross section. The stem member 136 is secured to the cross bar 131 by a clamping block 137, the bar 131 having a recess 138 for receiving a portion of the stem 136 and the clamping block 137 having a cooperating complementary stem receiving recess 139. The cutting dies may be suitably heated, if desired, to reduce cutting pressure and also to eliminate ragged edges on the cut-out lids.

The side frame members 130 and 130' are supported on cross shafts 140 and 141. The cross shaft 140 is journaled at its opposite ends in bearing blocks 142 and 142' which are attached to upright post members 143 and 143' of the base frame 15 at the forward side of the machine. The cross shaft 141 is journaled at its opposite ends in bearing blocks 144 and 144' which are mounted on the lower edges of the side frame members 55 and 55' of the main frame 15. The axes of the shafts 140 and 141 are on a radial line extending through the axis of the drum shaft 21. The shafts 140 and 141 carry eccentrics 145, 145' and 146, 146' which are rotatably received in the cylindrical bearing formations 147, 148 and 147', 148' in the respective side frame members 130 and 130'. Rotation of the shafts 140 and 141, of course, causes the supporting frame 33 to travel in a circular path with the cutting blades 133 moving toward the anvil plates 64 on the forming die assemblies 22 as illustrated in FIGURES 11 to 16. The retractive movement of the cutting blades 133 away from the anvil plates 64 is, of course, the reverse of the movement shown in FIGURES 11 to 16. This operation of the cutting die mechanism 32 results in simultaneous shear cutting of the material in the web 10 around each of the formed articles 11 in successive transverse or axial lines on the drum while the drum is rotating continuously without interrupting the advancing movement of the web around the same.

To further insure that the cutting blades 133 are accurately aligned with the die assemblies 22 during the die cutting operation, a movement locking apparatus is provided which comprises bracket plates 150 and 150' secured to the free ends of the side frame members 130 and 130', respectively, and carrying rollers 151 and 151' which are adapted to engage in locking slots 152, 152' in plates 153, 153' which are fixed to the opposite ends of the drum 20 in position to receive the rollers 151, 151' on the brackets 150, 150'. The plates 153 and 153' are aligned transversely of the machine and secured to the opposite ends of each die holder frame 61, so as to insure that the cutting blades 133 will be properly aligned relative to the anvil plates 64 and the rim formations 67 of the lid forming die assemblies 22 for the cutting operation. Each cutting blade 133 is caused to travel in a circuit path, the two eccentrics being operated in phase and their operation being properly timed with relation to the movement of the drum 20 so as to effect the cutting in the manner indicated in FIGURES 11 to 16.

The formed and cut lids 11 are removed from the die assemblies 22 by suction pick-off devices 31 which are carried on the cross frame structure 27 extending between the two side arms 102 and 102' of the oscillating frame 25. The cross frame structure 27 (FIGURES 1, 5, 17 and 18) comprises a plate member 155 bent into channel form and providing a U-shaped cross section with a bottom web 156 and upstanding side walls or flanges 157 and 158. The cross frame member 155 is provided at its opposite ends with end plates 159 and 159' on the outside faces of which are secured transversely aligned pivot shafts 160 and 160' which pivot shafts are journaled in bearings 161 and 161' in the free ends of the frame arm members 102 and 102' whereby the cross frame structure 27 is rotatably mounted on the oscillating frame 25 for rotational or swinging movement about a transverse axis by mechanism which will hereinafter be described.

The lid pick-off devices 31 are mounted in transversely spaced relation on the wall forming inner flange 158 of the cross frame member 155. Each pick-off device 31 comprises a supporting stem 162 on the inner end of which a suction cup holder 163 is mounted. A suction cup 164 is supported on the inner end of the holder 163 and connecting passageways 165 are provided therein which are connected by the flexible conduit 166 with the pipe or conduit 167, the latter being mounted on the frame member 155 by means of brackets 168. The conduit 167 has a flexible section at one end connecting it with a control valve 170 carried on the frame member 155 which is in turn connected with the main vacuum line. The stem portion 162 of the suction cup device 31 is slidably supported in the bore of a bearing member 171 carried on the inside face of the flange 158 of the frame member 155 and is connected to the end of a piston 172 which extends from a hydraulic cylinder 173 supported on the outer flange 157. The cylinder 173 is connected by conduits 174 and 175 with transversely extending pipes or conduits 176 and 177 which are supported on the frame member 155 by brackets 178. The conduits 176 and 177 are connected at one end to a control valve 180 carried on the cross frame member 155 and connected by a flexible conduit 181 with the main hydraulic system.

The cross frame structure 27 is reciprocated in an arcuate path about the pivots 160 and 160' by operation of lever arm 182 which is secured to the end of the pivot shaft 160', and which is pivotally connected at its free end at 183 to the end of piston 184 extending from one end of the hydraulic cylinder 185. The hydraulic cylinder 185 has its other end pivotally connected at 186 to a suitable bracket 187 on the frame arm 102'. The hydraulic cylinder 185 is connected by conduits indicated at 188 and 189 with a control valve 190 carried on the frame arm 102' which is in turn connected into the main hydraulic system. The operation of the cylinder 185 is controlled by the valve 190 so as to swing the cross frame 27 and the vacuum pick-off devices 31 from the position shown in FIGURES 1, 5 and 18 where the lids 11 are removed by suction from the forming die assemblies 22 to the position indicated in dotted line in FIGURES 5 and 18 where the lids 11 are clear of the cylinder 20 and may be released into a partitioned chute indicated at 191 which removes the lids 11 from the machine. The swinging movement of the frame 27 from one position to the other is limited by stop pins 192 and 193 which are adjustably mounted in a bracket 194 fixed on the frame arm 102', the stop member 192 lying in the path of the intermediate portion of the lever arm 182 so as to limit the movement in the anti-clockwise direction as viewed in FIGURE 18 and the stop member 193 lying in the path of a tail section 195 of the lever arm 182 so as to limit the movement in the clockwise driection.

As the web 10, with the formed lids removed from the same, passes beyond the zone of operations of the pick-off devices 31, it is guided over the cross roll 95 and may be directed out of the machine to a suitable scrap recovery device in a conventional manner. A hold down roller 195 may be provided for the roller 95 which is mounted on arms 196, 196' pivoted on a cross bar 197, which is in turn supported at its ends by brackets 198, 198' fixed to the superstructure 16.

The drum carrying shaft 21 is driven by a gear 200 (FIGURES 2 to 4) carried on the shaft 21 at one side of the machine and engaging with a pinion 201 (FIGURES 3 and 4) mounted on the inner end of a shaft 202 which is supported at its inner end in the bearing bracket 203 (FIGURE 1) on the side frame member 55. The shaft 202 carries on its outer end a gear 204 which engages with a pinion gear 205 carried on the main drive shaft 206. The shaft 206 is supported in a bearing in an outboard bearing bracket 207 which is secured on the end post 143 and side frame member 55 at one side of the main frame 15 of the machine. A pinion gear 208 also on shaft 206 engages with an idler gear 209 on a stub shaft 210, the latter being also journaled in the outboard bearing bracket 207. The gear 209 engages in driving relation with the gear 211 which is carried on the cam shaft 121, the latter having an end section extending to and journaled in the outboard bearing bracket 207. The gear 208 is also in driving engagement with a gear 212 carried on the end of the shaft 141 of the die cutting frame support mechanism. The gear 212 is connected in driving relation with a gear 213 on the cross shaft 140 through an intermediate idler gear 214 which is carried on a stub shaft 215, the latter being supported in the outboard bearing bracket 207. The drive shaft 206 carries a sprocket 216 on its outer end which is connected by a drive chain 217 to the output sprocket 218 on a drive motor unit 220, the latter being mounted on a suitable supporting platform at the base of the machine. A suitable hydraulically operated single point engagement type clutch 221 with an electrically operated control valve 222 (FIGURE 20) is provided for connecting the drive gear 208 to the drive shaft 206, so as to enable the assist plug, cutting and pick-off mechanisms to be disconnected from the motor drive when desired.

Preferably, one of the cam plates 28 is provided with a brake mechanism which comprises a brake shoe 225 (FIGURES 1 to 3) pivotally mounted at 226 on the upper end of a lever 227 which is pivoted on the shaft 228 carried on a supporting bearing bracket 229 which is secured on the end of the side frame member 55. The lower end of the lever arm 227 is pivotally connected at 230 to the end of the piston 231 of the hydraulic cylinder 232 which is supported on the bracket 233 extending outwardly of the corner post 143 of the main frame 15 of the machine. The actuation of the brake is controlled by a spring return solenoid operated valve 234 (FIGURE 20) so that it is applied to stop the movement of the oscillating frame 25 when the drive of the latter is interrupted.

An auxiliary heater may be provided for maintaining the temperature of the web 10 as it engages with the surface of the molding drum 20. The heater, as shown in FIGURE 1, comprises a series of radiant heating elements 240 mounted in a housing 241 which extends transversely of the machine above the molding drum 20 and is supported on the end of bracket arms 242 secured on a cross bar 243 which is in turn secured at its ends to the side frame members 37 and 37' which carry the web feed mechanism.

The operation of the machine is controlled electrically with the various hydraulic cylinders being actuated by electropneumatic valves which receive fluid from a supply line and deliver it to the various cylinders in proper sequence to effect the operation of the different mechanisms for performing the successive operations required to make the lids 11. In FIGURE 20 the various valves and switches are shown schematically when the apparatus is set up for automatic operation under the control of a standard timing mechanism.

In operating the machine, the motors 220 and 53 which drive the feed rollers 35 and 36 and the other operating mechanisms on the machine are started. The motor 220 rotates the cylinder 20 and when the clutch 221 is engaged by the operation of the valve 222 also drives the cam shaft 121 and the cross shafts 140 and 141 which control the movement of the die cutting mechanism 32. The web 10 is extruded from the head 19 and passed through the sizing rollers 17 and 18 between which the web 10 advances to the forming or molding drum 20 when the upper feed roller 17 is lowered by operation of the control valve 42. The web passes down around the front and bottom surfaces of the drum 20 and upwardly at the rear to the cross roller 95. The oscillating frame 25 is operated by the cams 28 and the die cutting mechanism 32 is operated by rotation of the shafts 140 and 141. Successive rows of lids 11 are formed by suction alone or with the help of the assist plugs 30, on the forming die assemblies 22 which are carried on the drum 20 while the latter rotates continuously. When the assist plugs 30 are used, the control valve 117 is operated in timed relation to the movement of the drum 20 and the oscillating frame 25 to move the plugs 30 into operative position and then withdraw the same. The die cutting mechanism 32 operates to engage the cutting blades 133 with successive anvil plates 64 on the forming die assemblies 22 in timed relation to the movement of the drum so as to cut the lids 11 free from the web 10, suction being applied through the die assemblies 22 during the cutting to hold the web and the formed lids against any shifting movement. As the drum 20 advances to the take-off station the pick-off heads 31 are reciprocated by operation of the valve 180 to engage with the row of cut lids 11 and suction is applied by operation of the valve 170 to hold the lids on the heads 31 while the supporting frame is swung by operation of the control valve 190 through an approximately 30° arcuate path and the lids are released so as to drop into the discharge chute for removal from the machine.

The electrical control arrangement provides push button switches as indicated in FIGURE 20 for starting and stopping the drive motors and selector switches SS1 to SS6 which permit manual push button control of the movement of the assist plugs 30 and pick-off heads 31 and automatic operation of the remaining elements. Cam limit switches of a standard cycle timing device are indicated at CS1 to CS9. A pressure switch PS is also provided to automatically stop the machine when the pressure in the hydraulic system drops below a predetermined level.

While the cross frame structure 26 on the oscillating support frame 25 is shown as supporting a series of assist plugs 30, the latter may not be necessary where the lids or other articles being formed on the dies 23 are relatively shallow, and a deep draw is not required. Some articles, such as the lids 11, when formed with a relatively thin wall and from certain plastic materials, can be shaped satisfactorily on the dies 23 by the use of suction alone without the need for the assist plugs. In that event, the cross frame 26 may be employed to support other mechanisms for operating on the articles as they are formed on the dies 23.

In a modification which is illustrated in FIGURE 21, the cross frame structure 26 is provided with a series of transversely spaced drills 250 which are pneumatically operated to drill a small hole in the center panel 12 of each lid 11 which, when the lid is used, provides for relieving the pressure in the cups or other receptacles to which the lid is applied.

The drills 250 are mounted on the side walls 105 and 105′ of the channel-like cross frame member 103 with the drill chuck 251 extending toward the molding drum 20 so as to position a drill 252 for engagement with the top wall of a lid formed on the die 23, the latter being modified to provide a clearance aperture 253 for the end of the drill with a retractable spring pressed anvil pin 254 seated in slidable relation in the clearance aperture 23. The drill is the type in which the chuck 251 is mounted on a spindle which is axially reciprocated in the drill housing. The spindle is rotated by air supplied through the connection 255 with a supply line 256 while axial movement of the spindle is obtained by air supplied through the connection 257 with a supply line 258, the latter being under the control of a suitable valve 260. In operating this form of the apparatus, the drill is rotated continuously. The movement of the frame 26 is properly timed in relation to the advancing movement of the molding drum 20 and the spindle is advanced to engage the drill with the lid immediately after the latter has been formed on the die 23. The frame 26 may, of course, be provided with any other similar device for operating on the web or the article being formed on the molding drum.

While specific materials and particular details of construction have been referred to in describing the form of the machine which is illustrated in the drawings, it will be understood that other materials and different structural details may be resorted to within the scope of the invention.

I claim:

1. A machine for forming articles from a moldable plastic web comprising a cylindrical molding frame mounted for continuous rotation on its major axis and having a series of molding dies spaced around the periphery thereof, means for guiding a web of plastic material in a path around the periphery of the molding frame, said web being advanced over the molding dies on a portion of the peripheral surface of the molding frame, a supporting structure comprising laterally spaced side frames which are rotatably mounted on an axis coinciding with the axis of rotation of the molding frame, and cross frame members extending between said side frames which cross frame members are circumferentially and outwardly spaced around the periphery of the molding frame, means on the first one of said cross frame member in the direction of advance of the web for cooperating with the dies on the molding frame in forming articles in the traveling web which is advancing between the same, means on another cross frame member which is spaced from said first cross frame member for removing molded articles from the molding dies, and means disposed between said cross frame members for cutting the formed articles from the web, said cutting means being mounted to move toward and from the molding frame in a generally radial path outwardly of the molding frame and to engage with the web and cut the articles therefrom without interrupting the travel of the molding frame and the web.

2. A machine for forming articles from a web of moldable plastic sheet material comprising a molding cylinder mounted on a continuously rotating shaft and having a series of molding dies spaced around the periphery thereof, means for guiding a web of plastic material in a path around the periphery of the cylinder, said web extending over molding dies on a portion thereof, a swinging frame structure having end frames mounted to rotate on the cylinder shaft at opposite ends thereof, channel-like frame members extending between said end frames in parallel relation to the drum shaft and circumferentially spaced, a series of assist plug members reciprocably mounted on one of the channel frame members for cooperation with the molding dies on the cylinder to form thereon articles in the web, article removing members carried on another channel frame member, means for reciprocating said frame structure so as to move said assist plugs and said article removing members in a closed path adjacent the periphery of the molding cylinder, a supporting frame arranged adjacent the molding cylinder in the space between the path of the assist plug members and the article removing members and a series of cutting dies on said supporting frame, said supporting frame having side arm portions extending in a generally radial direction outwardly of the molding cylinder, and radially spaced rotating eccentrics connected to said side arm portions to move said supporting frame in a circular path so as to engage the cutting dies with the web for severing the articles therefrom.

3. A machine for forming articles from a web of moldable plastic sheet material comprising a molding drum mounted on a cross shaft and having rows of molding dies spaced around the periphery thereof, means for rotating said drum continuously, means for delivering a web of plastic material to the drum, means for clamping the edges of the web around a portion of the periphery of the drum so as to hold said web against the peripheral surface of the drum and over one or more rows of molding dies thereon, a frame structure having end frames rotatably mounted on the drum cross shaft at opposite ends of the drum, cross frame members extending between said end frames in parallel relation to the drum shaft and spaced in the direction circumferentially of the drum, a series of spaced molding members mounted on the cross frame for cooperation with successive rows of molding dies on the drum to form thereon rows of articles in the web as the latter is carried on the surface of the drum, a row of spaced article removing members carried on said cross frame members in peripherally spaced relation to the row of molding members, and means for reciprocating the molding members and the article removing members toward and from the molding dies while the frame structure and the molding drum are rotating.

4. A machine for forming articles from a web of moldable plastic sheet material comprising a molding drum mounted on a transverse shaft and having a series of circumferentially and transversely spaced molding dies on the periphery thereof, means for rotating said drum continuously, means for delivering a web of plastic material to the drum, means for guiding the web around a portion of the periphery of the drum so that the web extends over the molding dies thereon, a frame structure having end frames rotatably mounted at opposite ends of the drum, cross frame members extending between said end frames in parallel relation to the drum shaft and circumferentially spaced, means for swinging said frame structure in a closed path with said cross frame members each opposite a row of said molding dies at one point in their path, a series of web engaging members mounted on the cross frame for cooperation with the molding dies on the drum to form thereon successive rows of articles in the web, a series of transversely spaced article removing members carried on said cross frame members in peripherally spaced relation to the web engaging members, a rectangular supporting frame arranged in a radially extending plane adjacent the molding drum between the web engaging members and the article removing members which supporting frame has a series of cutting dies positioned in transversely spaced relation along a side thereof adjacent the surface of the drum, said cutting die supporting frame having its ends mounted on pairs of eccentrics and radially spaced cross shafts supporting said pairs of eccentrics whereby rotation of said shafts carries the cutting dies into engagement with the web on the drum so as to cut therefrom the formed articles.

5. A machine for forming articles from a moldable plastic web comprising a molding drum mounted for continuous rotation on an axis extending transversely of the machine and having a series of molding dies spaced around the periphery thereof, means for supplying a web of moldable plastic material and for advancing the same around the drum so that it is draped over the molding dies on a portion of the peripheral surface of the drum, a frame structure comprising end frame members in the form of angularly related arms which are rotatably mounted on an axis coinciding with the axis of the molding drum, and cross frame members extending between said end frames which cross frame members are in outwardly spaced relation to the periphery of the drum and circumferentially spaced from each other, means on one of said cross frame members for cooperating with successive molding dies on the drum in forming the articles in the traveling web, a series of suction cup holders slidably mounted on the other one of said cross frame members, suction cups on said holders, means for reciprocating said suction cup holders toward and from the molding drum for removing the article from the drum, and means to swing said frame structure about its axis so that during a portion of its swing the movement thereof is in the same direction and at the same speed as the movement of said drum.

6. A machine for forming articles from a moldable plastic web comprising a molding drum mounted for continuous rotation on its major axis and having a series of molding dies spaced around the periphery thereof, means for guiding a web of plastic material into engagement with the dies on the drum, a supporting structure comprising laterally spaced end frames and connecting cross frames, said end frames being rotatably mounted on an axis coinciding with the axis of rotation of the molding drum, said cross frames extending between said end frames in outwardly spaced relation to the periphery of the drum and circumferentially from each other, means on one of said cross frames cooperating with the molding dies on the drum in forming articles in the traveling web, means on another of said cross frames for removing molded articles from the dies, and means mounted between said article forming means and said article removing means for severing the web to release the articles formed therein, said web severing means comprising end frames and a connecting cross frame, a pair of parallel cross shafts radially spaced relative to the axis of rotation of the molding drum and to each other, eccentrics carried on said cross shafts and connected to the end frames of said web severing means so as to move said web severing means in a path to engage the web between said severing means and the surface of said drum and to sever the articles from the web thereby to permit release of said articles from the machine.

7. A machine for forming articles from a moldable plastic web comprising a molding drum mounted for continuous rotation on a horizontal axis and having a series of molding dies spaced around the periphery thereof, means for guiding a web of plastic material into engagement with the periphery of the drum, means for advancing the web over the drum so that it is draped over the molding dies on a portion of the periphery of the drum, a supporting structure comprising laterally spaced end frames which are rotatably mounted on an axis coinciding with the horizontal axis of the molding drum, and cross frame members extending between said end frames in outwardly spaced relation to the periphery of the drum and circumferentially spaced relative to each other, means on the first one of said cross frame members in the direction of the advance of the web for cooperating with the molding dies on the drum in forming articles in the traveling web, means on another of said cross frame members which is spaced from said first cross frame member for removing molded articles from the dies on said drum, means for rotating said supporting structure in timed relation to the rotation of said molding drum whereby said cross frame members advance a predetermined distance with said drum, article cutting die means disposed between said article forming means and said article removing means, means for supporting said article cutting die means for movement in a closed path adjacent the periphery of said drum, and means for moving said cutting die means in said closed path in timed relation to the movement of said drum, said closed path being so related to the path traversed by the molding dies that the cutting die means are engaged with the molding dies and cut the molded articles from the web while advancing with the drum.

8. A machine for forming articles from a web of moldable plastic sheet material comprising a molding drum mounted on a continuously rotating shaft and having a series of molding dies spaced around the periphery thereof, means for delivering a web of plastic material to the drum, means for guiding the web around a portion of the periphery of the drum, said web being engaged with the peripheral surface of the drum and extending over molding dies on a portion thereof, a frame structure having end frame members rotatably mounted on the drum shaft at opposite ends of the drum, cross frame members extending between said end frame members in parallel relation to the drum shaft and spaced circumferentially of the drum, means for imparting an oscillating movement to said frame structure so as to advance said frame structure in the same direction as said drum during a predetermined portion of each rotation of said drum, a series of forming members mounted on one of the cross frame members for cooperation with molding dies on the drum to form thereon articles in the web, a series of article removing members mounted on another of said cross frame members in peripherally spaced relation to the forming members, a supporting frame for cutting dies movably mounted adjacent the molding drum in the space between the cross frame members which carry the article forming members and the article removing members, a series of article cutting dies mounted on said supporting frame, and means for moving said cutting die supporting frame toward and from the drum so as to bring the cutting dies into engagement with the web on the drum and to free the formed articles from the web.

9. A machine for forming articles from a moldable plastic web comprising a molding drum mounted for continuous rotation on a tranverse axis and having a series of molding dies spaced around the periphery thereof, means for guiding a web of plastic material into engagement with the periphery of the drum so that it is draped over the molding dies on a portion of the peripheral surface of the drum, a supporting structure comprising laterally spaced end frames having arm members which are rotatably mounted on an axis coinciding with the transverse axis of the molding drum, and cross frame members extending between pairs of said end frames which cross frame members are disposed in outwardly spaced relation to the periphery of the drum and circumferentially spaced from each other, means to oscillate said supporting structure so as to move the same in the direction of rotation of the drum during a predetermined portion of a revolution of the drum, means on one of said cross frame members cooperating with the molding dies on the drum in forming articles in the traveling web, means on another of said cross frame members for removing molded articles from the dies on said drum, cutting means mounted between the cross frame members which carry said article forming means and said article removing means, said article cutting means being disposed between said cross frame members and comprising cutting dies mounted to move in a circular path adjacent the path of movement of said drum, means to move said cutting dies in said path in timed relation to the movement of said drum so as to engage the cutting edge of each cutting die thereon with the web and against a molding die on the drum while the web and drum are advancing whereby to cut the molded articles from the web.

10. A machine for forming articles from a moldable plastic web comprising a molding drum mounted for continuous rotation on its major axis and having a series of molding dies spaced around the periphery thereof, means for guiding a web of plastic material into engagement with the dies on the molding drum, means cooperating with the molding dies for forming articles in the web, means for cutting the articles free of the web so as to leave the articles on the molding dies, a supporting structure comprising laterally spaced end frame members and a connecting cross frame, said end frame members being pivotally mounted on an axis coinciding with the axis of rotation of the molding drum, and said cross frame extending between said end from members in outwardly spaced relation to the periphery of the molding drum, said cross frame being pivoted to said end frame members on an axis which is parallel with the axis of rotation of the molding drum, a series of spaced suction cup holders reciprocably mounted on said cross frame, suction cups on said holders, means for reciprocating said suction cup holders to engage the suction cups with articles on the molding dies, means for oscillating the supporting structure on its axis in timed relation to the movement of the molding drum and means for oscillating the cross frame on its axis so as to position the suction cups in alignment with successive molding dies on the drum whereby to remove the formed articles from the molding dies.

11. A machine for forming articles from a moldable plastic web comprising a cylindrical molding frame mounted for continuous rotation on its major axis and having a series of molding dies spaced around the periphery thereof, means for rotating the molding frame continuously, means for guiding a web of moldable plastic material into engagement with the dies on the molding frame, means cooperating with said molding dies for forming articles thereon from said plastic web, and means for cutting the web so as to leave the molded articles on the molding dies, a supporting frame structure comprising end frame members and a cross frame, said end frame members being pivotally mounted at opposite ends of said molding frame on an axis coinciding with the axis of rotation of the molding frame and said cross frame being connected to said end frame members by pivots which have their axes of rotation parallel with the axis of rotation of the molding frame, a hydraulic cylinder mounted on said cross frame with its piston normally extending on a radial line toward the molding frame, a suction cup on the end of the piston, means to swing the supporting frame in a path to bring the suction cup into alignment with successive molding dies on the molding frame, means to operate the hydraulic cylinder in timed relation to the movement of the supporting frame so as to engage the articles on the dies and remove the same in a radial direction, and means to swing the cross frame on its pivots in timed relation to the movement of the supporting frame so as to carry the articles in an arcuate path away from the supporting frame for discharge from the suction cup.

12. A machine for forming articles from a moldable plastic web comprising a molding drum mounted for continuous rotation on its major axis and having a series of molding dies spaced around the periphery thereof, means for guiding a web of plastic material into engagement with the dies on the drum, a supporting structure comprising laterally spaced end frames which are mounted at the ends of the molding drum for rotation on the axis of rotation of the molding drum, and a plurality of cross frames extending between said end frames which cross frames are disposed adjacent the periphery of the drum in circumferentially spaced relation, means for oscillating said supporting structure so that said cross frames travel with said drum during a predetermined portion of each rotation of said drum, article shaping means on one of said cross frames for cooperation with successive molding dies on the drum in forming articles in the traveling web, means on another of said cross frames which is spaced from said one cross frame for removing molded articles from the dies, web cutting means disposed between the cross surface of said molding drum to cut therefrom the article removing means for engaging the web against the surface of said molding drum to cut therefrom the articles formed on the dies, said web cutting means being mounted on a transversely extending movable frame, and means to move said transverse frame in a closed path adjacent the periphery of said drum so as to engage said web cutting means with the web and against the dies thereby to sever the articles from the web so as to permit release of said articles for removal from the machine by said article removing means.

13. A machine for forming articles from a moldable plastic web comprising a cylindrical frame mounted for rotation on its major axis and having a series of molding dies spaced around the periphery thereof, means for guiding a web of plastic material into engagement with the top of the cylindrical frame so that it passes down and around a portion of the periphery thereof, a supporting structure comprising laterally spaced end frames rotatably mounted on an axis coinciding with the axis of rotation of the cylindrical frame, and spaced cross frames extending between said end frames adjacent the periphery of the cylindrical frame, means for rotating said supporting structure in timed relation to the rotation of said cylindrical frame so as to move said cross frames with said cylindrical frame for a predetermined portion of the rotation of said cylindrical frame, molding dies on one of said cross frames for cooperation with the molding dies on the cylindrical frame in forming articles in portions of the traveling web, means on another of said cross frames for removing molded articles from the dies on the cylindrical frame, and means disposed between said cross frames for severing the web to release the articles formed therein, said web severing means being mounted for movement in a closed generally circular path adjacent the path of the dies on the cylindrical frame and means to move said web severing means so as to engage with the web at a point in said path and to sever the articles from the web thereby to permit release of said articles from the machine.

14. A machine for forming articles from a moldable plastic web comprising a cylindrical die support mounted for continuous rotation on its major axis and having a plurality of axially extending rows of molding dies spaced around the periphery thereof, means for guiding a web of moldable plastic material into engagement with the dies on the molding die support, means cooperating with the dies for forming articles therein, a supporting frame structure having end portions pivotally mounted on an axis coinciding with the axis of rotation of the molding die support and having cross frames which extend between the end portions adjacent the periphery of the molding die support, a row of drills mounted on one of said cross frames which drills have reciprocating spindles extending in the direction of the molding die support, another one of said cross frames which is spaced from the first mentioned cross frame and having means thereon for removing articles from the molding dies, means to reciprocate said supporting frame structure in a closed path so as to bring the drills and the article removing means into alignment with spaced rows of molding dies on the molding die support, for a predetermined portion of each rotation of said molding die support, and means to reciprocate the drill spindles in timed relation to the movement of said supporting frame structure so as to drill holes in a row of articles while said drills are in alignment with the molding dies.

References Cited in the file of this patent

UNITED STATES PATENTS

| | | |
|---|---|---|
| 483,663 | Warren | Oct. 4, 1892 |
| 1,654,647 | Heist | Jan. 3, 1928 |
| 2,120,328 | Ferngren | June 14, 1938 |
| 2,285,150 | Ferngren | June 2, 1942 |
| 2,590,379 | Cloud | Mar. 25, 1952 |

FOREIGN PATENTS

| | | |
|---|---|---|
| 701,862 | Germany | Jan. 25, 1941 |
| 789,966 | Great Britain | Jan. 29, 1958 |

UNITED STATES PATENT OFFICE
CERTIFICATE OF CORRECTION

Patent No. 3,071,812 January 8, 1963

William L. Miller

It is hereby certified that error appears in the above numbered patent requiring correction and that the said Letters Patent should read as corrected below.

Column 2, line 7, for "pehipherally" read -- peripherally --; column 8, line 40, for "circuit" read -- circular --; column 16, line 44, after "cross" insert -- frames carrying said article forming means and said article removing means for engaging the web against the --; lines 45 to 47, strike out "article removing means for engaging the web against the surface of said molding drum to cut therefrom the".

Signed and sealed this 27th day of August 1963.

(SEAL)
Attest:

ERNEST W. SWIDER
Attesting Officer

DAVID L. LADD
Commissioner of Patents